United States Patent
Kakumaru

(10) Patent No.: US 8,311,540 B2
(45) Date of Patent: Nov. 13, 2012

(54) WIRELESS COMMUNICATION TERMINAL, WIRELESS COMMUNICATION NETWORK SYSTEM AND HANDOVER TIMING DETERMINING METHOD

(75) Inventor: Takahiro Kakumaru, Tokyo (JP)

(73) Assignee: NEC Corporation, Tokyo (JP)

( * ) Notice: Subject to any disclaimer, the term of this patent is extended or adjusted under 35 U.S.C. 154(b) by 667 days.

(21) Appl. No.: 12/443,726

(22) PCT Filed: Oct. 5, 2007

(86) PCT No.: PCT/JP2007/069594
§ 371 (c)(1),
(2), (4) Date: Mar. 31, 2009

(87) PCT Pub. No.: WO2008/044645
PCT Pub. Date: Apr. 17, 2008

(65) Prior Publication Data
US 2009/0270105 A1    Oct. 29, 2009

(30) Foreign Application Priority Data
Oct. 11, 2006   (JP) ................................ 2006-277120

(51) Int. Cl.
*H04W 36/00* (2009.01)
*H04W 4/00* (2009.01)
(52) U.S. Cl. ....................................... 455/436; 370/331
(58) Field of Classification Search .................. 455/436; 370/331
See application file for complete search history.

(56) References Cited

U.S. PATENT DOCUMENTS

| 5,150,362 | A  | * | 9/1992  | Akerberg ........................ 370/331 |
| 5,754,959 | A  | * | 5/1998  | Ueno et al. ..................... 455/453 |
| 7,003,298 | B1 | * | 2/2006  | Jagadeesan ..................... 455/442 |
| 8,099,095 | B2 | * | 1/2012  | Neufeld et al. ................. 455/437 |
| 2002/0119779 | A1 | * | 8/2002  | Ishikawa et al. ............... 455/437 |
| 2005/0136927 | A1 | * | 6/2005  | Enzmann ........................ 455/436 |
| 2007/0249291 | A1 | * | 10/2007 | Nanda et al. ..................... 455/73 |
| 2009/0270105 | A1 | * | 10/2009 | Kakumaru ...................... 455/436 |

FOREIGN PATENT DOCUMENTS

| JP | 2001036936 A | 2/2001 |
| JP | 2002199428 A | 7/2002 |
| JP | 2002232929 A | 8/2002 |
| JP | 2005101930 A | 4/2005 |
| JP | 2005535230 A | 11/2005 |

OTHER PUBLICATIONS

International Search Report for PCT/JP2007/069594 mailed Jan. 15, 2008.

* cited by examiner

*Primary Examiner* — Dwayne Bost
*Assistant Examiner* — Larry Sternbane

(57) ABSTRACT

A wireless communication terminal includes a first detecting section for detecting whether or not a reception signal level indicating a level of a received signal from a base station currently in connection as the first base station reduces to be equal to or lower than a first threshold level, a second detecting section for detecting whether or not a communication situation of a communication application program currently in communication is a situation suitable for handover, a third detecting section for detecting whether or not a predetermined handover forcedly performing condition is established, a determining section for determining whether or not the handover control is necessary, based on detection results of the first to third detecting section, and a communication control section for performing a handover control to switch from the first base station to a second base station when the switching to the handover control is necessary.

2 Claims, 13 Drawing Sheets

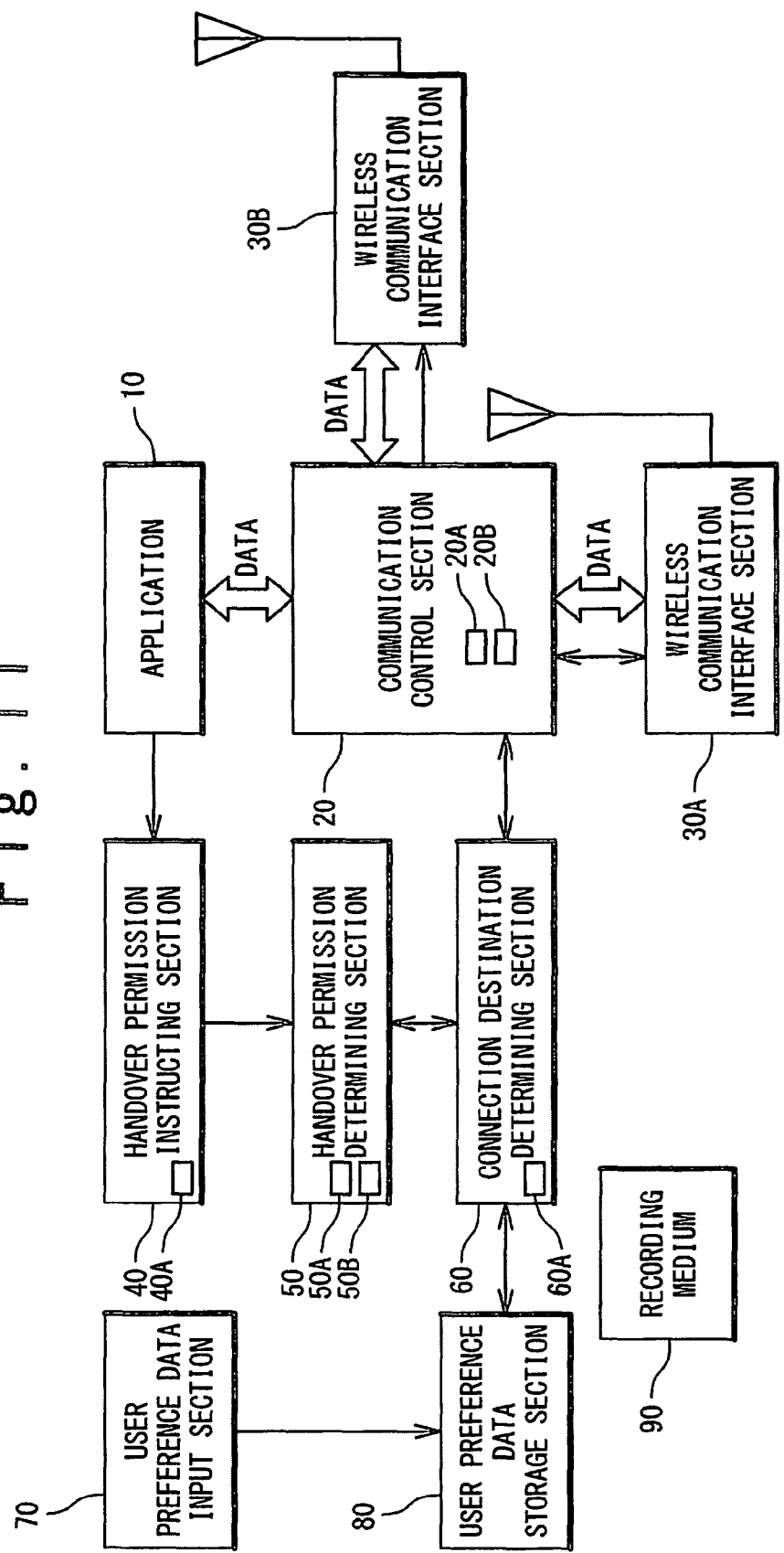

WIRELESS COMMUNICATION TERMINAL, WIRELESS COMMUNICATION NETWORK SYSTEM AND HANDOVER TIMING DETERMINING METHOD

This application is the National Phase of PCT/JP2007/069594, filed Oct. 5, 2007, which is based upon and claims priority from Japanese Patent Application No. 2006-277120 filed Oct. 11, 2006.

TECHNICAL FIELD

The present invention relates to a wireless communication terminal that performs a handover control between it and a base station, and more particularly relates to a determining method of a switching timing to a handover control.

BACKGROUND ART

In recent years, various wireless communication devices such as WLAN (Wireless Local Area Network) have been installed in apparatuses such as a personal computer, a peripheral device, a mobile telephone, a game machine, and home electronics. Among them, in a mobile apparatus such as a note type personal computer, the mobile telephone, and the game machine, there is a case that a user moves while executing an application. For example, a situation in which the user moves while making a call by using the mobile telephone can be easily imagined.

When the user moves while performing wireless communication, there is a case that a wireless communication terminal exceeds an electromagnetic wave receivable area from a wireless base station with which it is communicating or that another base station in a better electromagnetic wave receiving state exists. In such a case, a process of switching the base station with which the wireless communication terminal communicates is generated. For example, in case that there are a plurality of candidates as a connection destination base station at the same time, the switching process is generated from a base station with which the wireless communication terminal is connected to another base station, reception electric field intensity from which is stronger than that from the base station when a level of reception signal from the base station (e.g. reception electric field intensity) decreases lower than a predetermined threshold level. The switching process generated at this time is typically referred to as a handover process.

The generation of the handover involves the following situation. Until the wireless communication terminal performs a data communication with a network through the base station, several processes are required such as negotiation for a connection, an authentication process as necessary, and a process of reserving a communication band. For example, there is a case that considerable processes and times are required, depending on a kind of the authentication process. Usually, these processes are required in not only the first connection to the base station but also switching of the base station in the handover. In short, in case of a wireless LAN, when the connection is switched between wireless LAN access points, a considerable connection destination switching time is required. It should be noted that while the connection destination is switched, the data communication is not performed through a newly-connected base station, until the completion of the switching of the connection.

Also, when the wireless communication terminal has two or more wireless communication devices different from each other, there is a case that the network environments are different to which the respective wireless communication apparatuses are connected. For example, one may be a network in which a delay on the network is little and fluctuation in a data transmission interval is null, and the other network may be a network in which a communication band is narrow, the delay is easily generated, and the fluctuation in the data transmission interval is great. At this time, when the switching is performed from one network to the other network (in this description, this switching is also referred to as the handover), the adverse influence on the data communication quality due to the difference in the network environment cannot be avoided. This situation is assumed in a mobile telephone network, a wireless LAN, Bluetooth, NFC, and IEEE 802.16e (WiMAX) whose installation is scheduled in future.

Moreover, even in one wireless interface, there is a possibility that a plurality of candidates of the connection destination network exist. For example, in the wireless LAN, a case that a plurality of wireless LAN access points are found at the same time and one of them is used for connection is considered. Thus, even in this case, there are the many candidates of the connection destination network.

In short, under the situation of the existence of the many wireless interfaces or under the situation of the existence of the many candidates of the connection destination network even in one wireless interface, the situation in which the switching between the communication devices and between the connection destinations is performed, is considered to be increased more and more in future.

If a speech communication or a video reception is performed, when the handover is generated, under the condition that the wireless communication terminal is under any of the foregoing situations, when the quality degradation in the speech communication or discontinuity of reception of the video communication is generated at the timing of the handover. Thus, the lowering of service quality is feared.

Conventionally, the switching of the wireless communication network under the control by the wireless communication terminal is performed at a timing in case of manual switching by a user, or automatically when there is another wireless base station that is connectable at a timing when the lowering of a reception signal level (the received electric field intensity or the like) from the currently connected wireless base station. In this case, the network switching is generated regardless of a communication state of the application being executed currently by the wireless communication terminal, that is, the handover is generated, without respect to the situation that the reception content is not especially desired to be cut. This results in the degradation of the service quality.

For this reason, a technique of controlling the timing of the handover on the basis of the communication state of an application being executed currently is described in Japanese Patent Application Publications (JP-P2001-36936A and JP-P2005-101930A).

In the mobile wireless terminal described in Japanese Patent Application Publication (JP-P2001-36936A), a silence period in speech communication is detected in order to prevent the discontinuity of the speech communication, and a threshold level with respect to a reception signal level (received electric field intensity or the like) is set to be higher than a usual level in the silence period so as to make the handover easier, and reversely, the threshold level is set to the usual level in a non-silence period so as to make the handover difficult.

Also, in the mobile communication terminal described in Japanese Patent Application Publication (JP-P2005-101930A), a handover condition based on a throughput (a reception rate) for each kind of an application is added in addition to the usual handover threshold level based on a communication quality, in order to perform the handover in a suitable period based on the application being executed currently. Specifically, only when a reception signal level representing the level of a reception signal from the base station currently in communication is lower than a preset handover threshold level and the reception rate satisfies a handover condition which is preset to the application.

DISCLOSURE OF INVENTION

According to the technique described in Japanese Patent Application Publication (JP-P2001-36936A), it is easy to perform the handover in the silence period, as compared with other periods. Thus, when a user performs speech communication by a mobile wireless terminal while moving, a probability in which the handover is performed in the silence period becomes high. However, the handover threshold level in a period other than the silence period remains at a usual level. Therefore, the control is switched to the handover as soon as the reception signal level becomes equal to or less than a handover threshold level during the speech communication. That is, the handover is easily performed at an improper timing in the application currently in execution.

On the contrary, according to the technique described in Japanese Patent Application Publication (JP-P2005-101930A), the switching to the handover is controlled depending on an establishment or not of a handover condition according to the communication state of an application currently in execution. Thus, it is possible to prevent the handover from being easily performed at an improper timing for the application currently in execution. However, even if the reception signal level continues to be much lower than the handover threshold level, the wireless communication terminal continues to wait for the handover condition according to the communication state of the application currently in execution. Therefore, there is a fear that the wireless communication terminal becomes a situation in which the handover cannot be performed anymore.

An object of the present invention is to prevent the switching to a handover at an improper timing in accordance with the communication state of a communication application in the wireless communication terminal, and also prevent the occurrence of a situation that a level of a reception signal from a base station is reduced to a level corresponding to a data communication disabled state so that the handover cannot be performed.

The wireless communication terminal of the present invention includes a communication control section connected with a first base station, for performing a handover control to switch from the first base station to a second base station in response to a connection request; a first detecting section for detecting whether or not a reception signal level indicating a level of a received signal from a base station currently in connection as the first base station reduces to be equal to or lower than a first threshold level; a second detecting section for detecting whether or not a communication situation of a communication application program currently in communication is a situation suitable for handover; a third detecting means for detecting whether or not a predetermined handover forcedly performing condition is established; and a determining means for determining whether or not the handover control is necessary, based on detection results of the first to third detecting means and outputting a connection request when the handover control is determined to be necessary.

BRIEF DESCRIPTION OF DRAWINGS

FIG. 11 is a block diagram showing a configuration of a wireless communication terminal according to a fourth exemplary embodiment of the present invention;

BEST MODE FOR CARRYING OUT THE INVENTION

Hereinafter, a wireless communication terminal of the present invention will be described in detail with reference to the attached drawings.

Figure 12A:
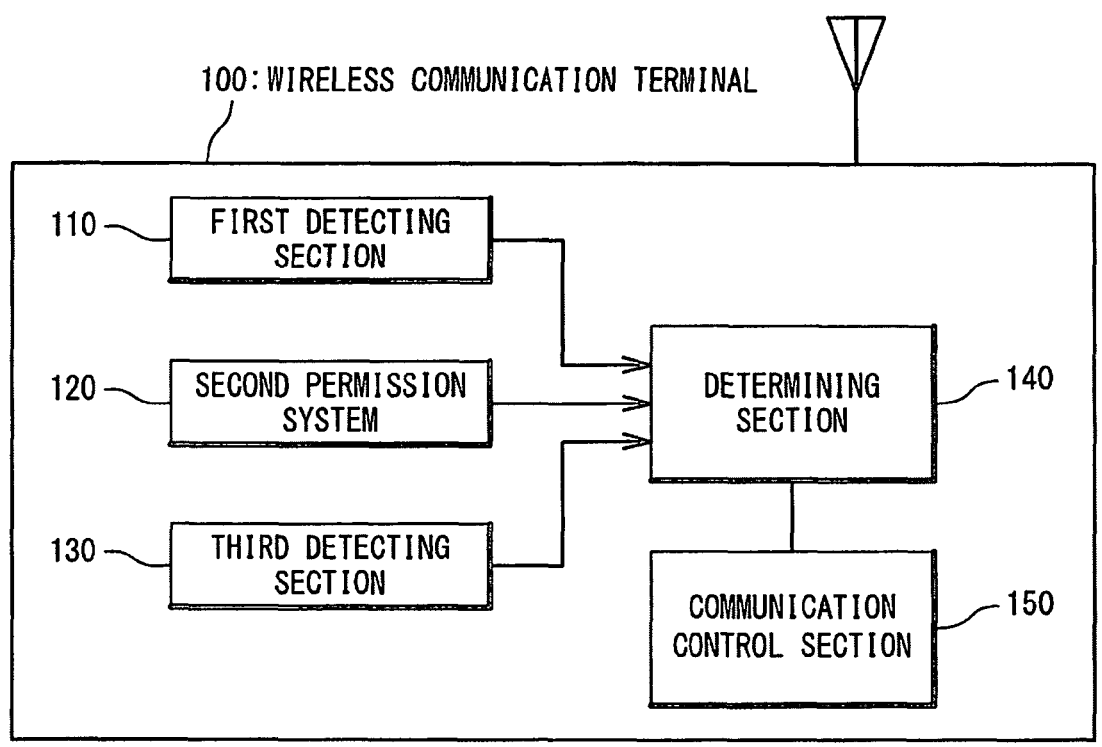
FIG. 12A is a block diagram showing a configuration of the wireless communication terminal of the present invention.

With reference to FIG. 12A, a wireless communication terminal 100 contains a first detecting section 110, a second detecting section 120, a third detecting section 130, a determining section 140 and a communication control section 150. The communication control section 150 is connected to the first base station and performs a handover control for switching from the first base station to a second base station in response to a connection request. The first detecting section 110 detects whether or not a reception signal level representing the level of a reception signal from a base station currently in connection which serves as the first base station becomes equal to or less than a first threshold level. The second detecting section 120 detects whether or not a communication state of a communication application program currently in communication in the terminal 100 is in a situation suitable for the handover. The third detecting section 130 detects whether or not a predetermined handover forcedly performing condition is established. The determining section 140 determines whether or not the handover control can be performed, based on the detection results of the first detecting section 110, the second detecting section 120 and the third detecting section 130, and outputs the connection request if the switching to the handover control is required.

The second detecting section 120 is provided in the communication application program, and the communication application program controls the second detecting section 120 to detect whether or not the communication state of its program is in a situation suitable for the handover. As the communication state of the communication application program currently in communication that is monitored by the second detecting section 120, there is presence or absence of a speech signal, in case of a speech communication application program. In this case, a silence period is detected as a situation suitable for the handover.

The handover forcedly performing condition monitored by the third detecting section 130 is established when an elapse time exceeds a preset time after a reception signal level of a reception signal from a base station currently in connection becomes equal to or less than a first threshold level. Or, it is established when the reception signal level becomes equal to or less than a second threshold level, which is lower than the first threshold level.

The determining section 140 totally checks the detection results of the first to third detecting section 110, 120 and 130, and determines whether or not the handover control is necessary between it and the base station. Specifically, the switching to the handover control is determined at any one of: when the reception signal level of the reception signal from the base station currently in connection becomes equal to or less than the first threshold level, and the communication state of the communication application program currently in communication becomes in the situation suitable for the handover; and when the reception signal level of the reception signal from the base station currently in connection becomes equal to or less than the first threshold level and the handover forcedly performing condition is established.

Figure 12B:
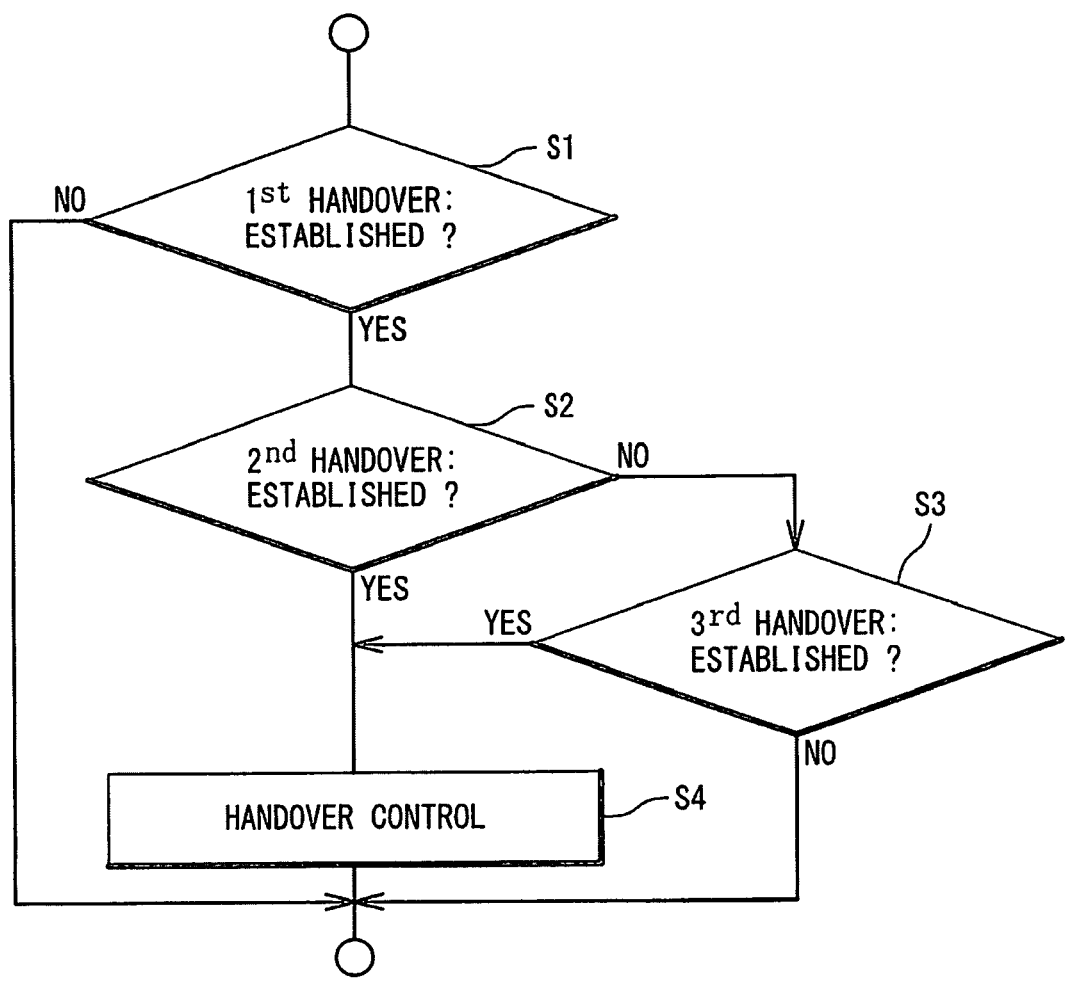
FIG. 12B is a flowchart showing a handover timing determining process, as the operation of the wireless communication terminal of the present invention.

With reference to FIG. 12B, as an operation of the wireless communication terminal 100 of the present invention, a handover timing determining method of the present invention contains the following steps S1, S2, S3 and S4. This handover timing determining method determines a timing when the handover control for switching from the first base station to the second base station in response to the connection request is performed to the wireless communication terminal connected to the first base station. At the step S1, the first detecting section 110 determines whether or not the first handover condition is established. At the step S2, if the first handover condition is established (Step S1—YES), the second detecting section 120 determines whether or not the second handover condition is established. At the step S3, if the second handover condition is not established (Step S2—NO), the third detecting section 130 determines whether or not the third handover condition is established. At the step S4, the determining section 140 determines any one of: the timing (Steps S1—YES, S2—YES) when the first and second handover conditions are both established; and the timing (Steps S1—YES, S2—NO, and S3—YES) when the first and third handover conditions are both established, as the timing of the switching to the handover control. Thus, the communication control section 150 performs the handover control.

Here, the first handover condition is established when the reception signal level of the reception signal from the base station currently in connection becomes equal to or less than the first threshold level. The second handover condition is established when the communication state of the communication application program currently in communication becomes in a situation suitable for the handover. The third handover condition is the handover forcedly performing condition. That is, the third handover control is established when the elapse time exceeds a preset time after the reception signal level of the reception signal from the base station currently in connection becomes equal to or less than the first threshold level or when the reception signal level becomes equal to or less than the second threshold level which is lower than the first threshold level.

In this way, according to the wireless communication terminal 100 of the present invention, when the reception signal level of the reception signal from the base station currently in connection becomes equal to or less than the first threshold level and also the communication state of the communication application program currently in communication becomes in the situation suitable for the handover, the operation is switched to the handover control. Thus, it is possible to prevent the switching to the handover at an improper timing correspondingly to the communication state of the communication application program in the wireless communication terminal 100.

Also, after the reception signal level of the reception signal from the base station currently in connection becomes equal to or less than the first threshold level, the operation is switched to the handover control at a time of the establishment of the predetermined handover forcedly performing condition, even if the communication state of the communication application program currently in communication does not reach the situation suitable for the handover. Thus, it is possible to prevent the occurrence of the situation in which the reception signal level from the base station is lowered to a level corresponding to a data communication disabled state so that the handover cannot be performed.

[First Exemplary Embodiment]

Figure 1:
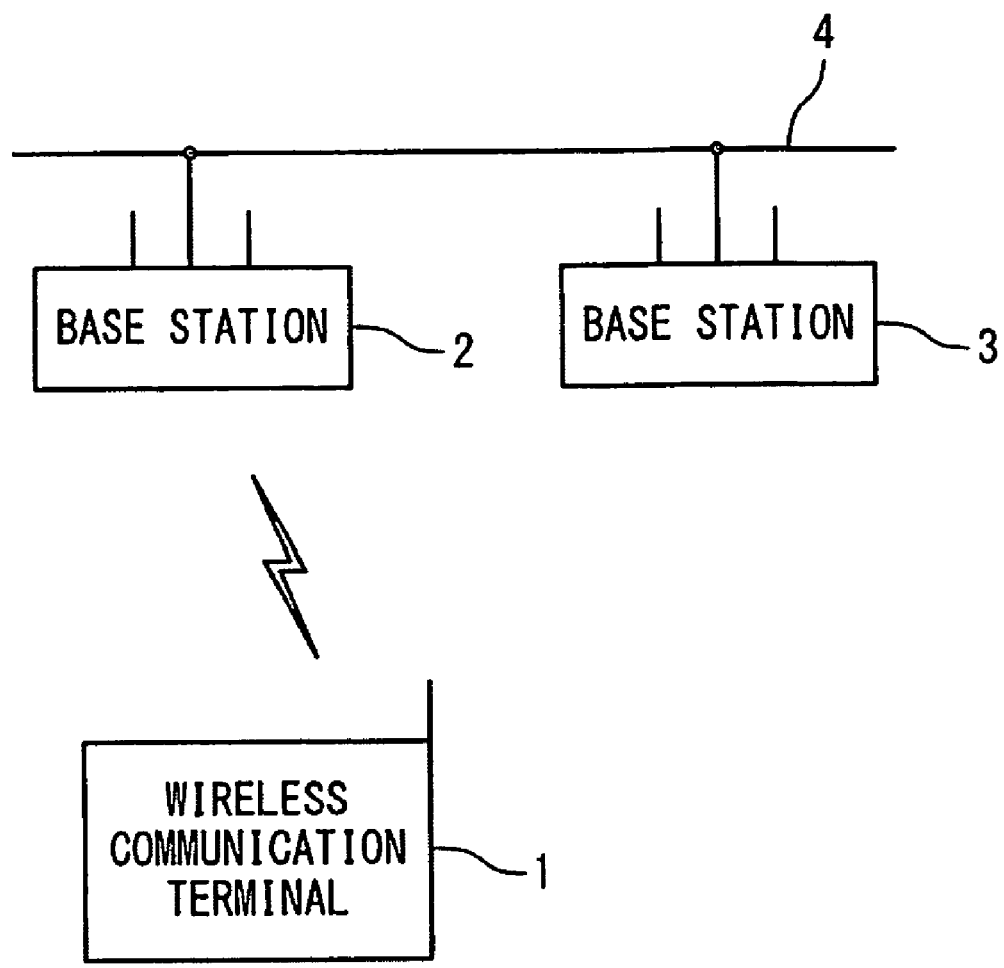
FIG. 1 is a block diagram showing a configuration of a wireless communication system according to a first exemplary embodiment of the present invention.

FIG. 1 is a diagram showing the configuration of the wireless communication system to which the wireless communication terminal according to a first exemplary embodiment of the present invention is applied. With reference to FIG. 1, the wireless communication system according to the first exemplary embodiment of the present invention contains a wireless communication terminal 1, a plurality of base stations 2 and 3 and a network 4. The network 4 is provided with one or more LAN (Local Area Network) lines or WAN (Wide Area Network) lines. The plurality of base stations 2 and 3 are connected to the network 4. The wireless communication terminal 1 uses a wireless or radio medium as a transmission medium and is connected through one base station of the plurality of base stations 2 and 3 to the network 4.

The base station 2 is configured to perform a function as a base station based on IEEE 802.11 that is the standard of the wireless LAN, and performs a connection negotiation in response to a connection negotiation request from the wireless communication terminal 1 and performs an operation of relaying the data communication between the wireless communication terminal 1 and a communicating apparatus (not shown) connected to the network 4, after the completion of the connection negotiation. Specifically, a connection negotiation procedure based on the IEEE 802.11 is performed in the outline as follows.

The wireless communication terminal 1 transmits an authentication frame to the base station 2 to be connected. The base station 2 based on the IEEE 802.11 responds to this by transmitting the authentication frame including an authentication result, to the wireless communication terminal 1. Next, the wireless communication terminal 1 transmits an association frame and consequently notifies that the connection to the base station 2 is performed. The base station 2 responds to this by transmitting the association frame, which includes an ID to identify the wireless communication terminal 1, to the wireless communication terminal 1. After that, as necessary, the authentication based on IEEE 802.1X and the exchange of a key to safely perform the communication are performed, resulting in completion of the connection negotiation. Thus, the data communication becomes possible. It should be noted that the base station 2 performs the operation of transferring a data from the wireless communication terminal 1 to the communicating apparatus connected to the network 4 and performs the operation of transferring the data to the wireless communication terminal 1 from the communicating apparatus connected to the network 4.

The base station 3 has a function similar to the base station 2 and performs the similar operation.

The wireless communication terminal 1 is configured to perform a function as a terminal based on the IEEE 802.11 and can communicate with a communicating apparatus connected to the network 4 through the base station 2 or 3 by using an Internet protocol (IP). Specifically, the wireless communication terminal 1 transmits an authentication frame to the base station to be connected. When the authentication frame including the authentication result is transmitted from the base station based on the IEEE 802.11, the wireless communication terminal 1 receives this and transmits an association frame to notify that the connection to the base station is performed. Subsequently, when the association frame including the ID to identify the wireless communication terminal is transmitted from the base station, the wireless communication terminal 1 receives this. After that, as necessary, the authentication based on the IEEE 802.1X and the exchange of the keys to safely perform the communication are performed, which results in the completion of the connection negotiation. Thus, the data communication with the base station and the data communication through the base station can be performed. Also, the wireless communication terminal 1 has a security function based on IEEE 802.11i when the further reinforcement of the security is required, and has an admission control function (a call admission control and the like) and a QoS (Quality of Service) function (a band insurance function and the like) based on IEEE 802.11e when the communication quality is required to be secured; and an optimizing function of the authentication based on IEEE 802.11r and the exchange of the keys when the high speed handover is required during the data communication. As necessary, the wireless communication terminal 1 may be configured to perform a function as a terminal based on the rules of the IEEE 802.11 other than the IEEE 802.11i, the IEEE 802.11e and the IEEE 802.11r.

When performing the network communication through the base station 2 or the base station 3, the wireless communication terminal 1 performs the connection negotiation with the base station 2 or the base station 3 by using a wireless physical layer. As necessary, there may be a case that the authenticating process is additionally executed. On the completion of the connection negotiation, the network communication can be performed through the base station.

Figure 2:
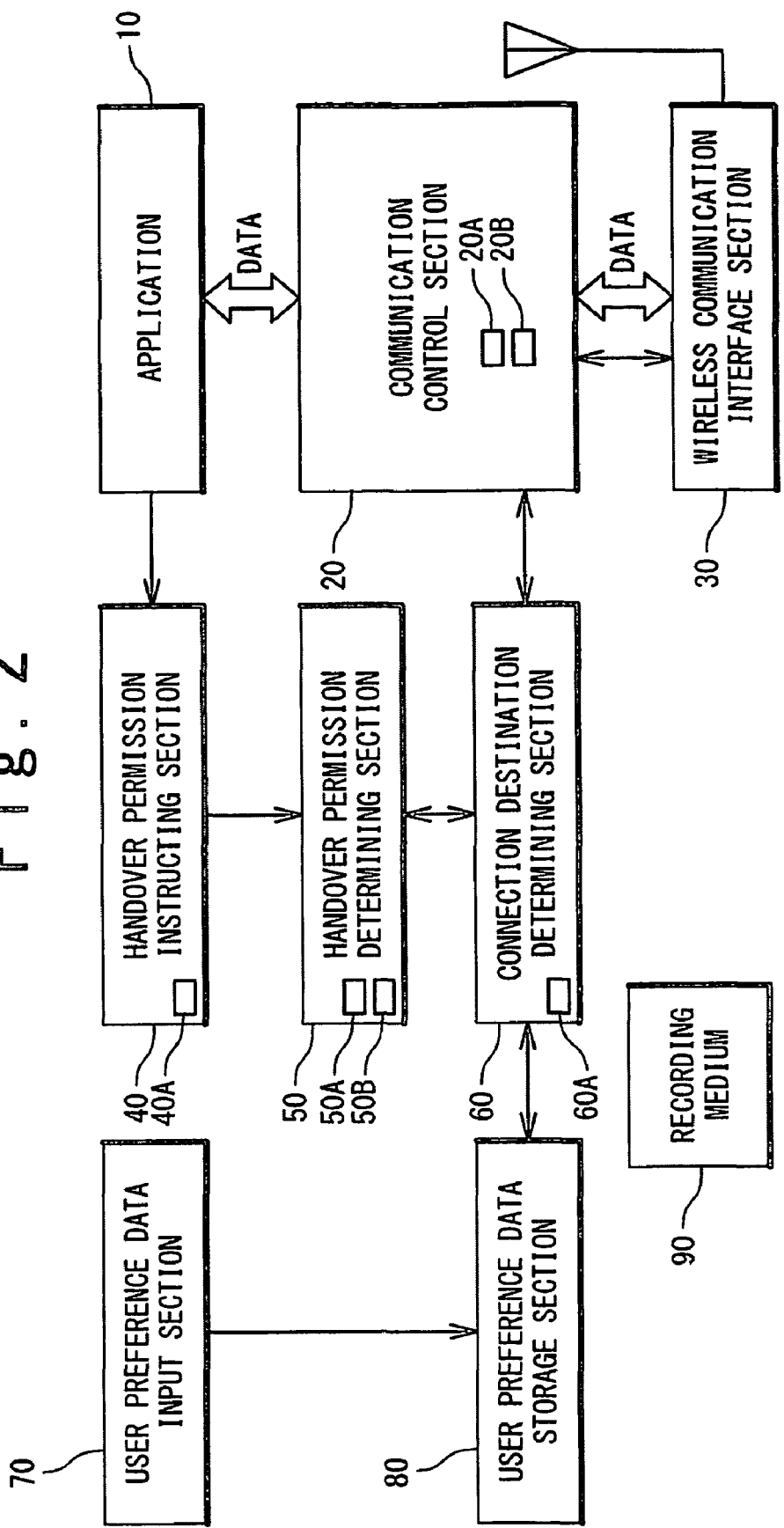
FIG. 2 is a block diagram showing a configuration of a wireless communication terminal in the first exemplary embodiment of the present invention.

FIG. 2 is a block diagram showing the configuration of the wireless communication terminal 1 in FIG. 1 according to the first exemplary embodiment. With reference to FIG. 2, the wireless communication terminal 1 contains a wireless communication interface section 30, one or more applications 10, a communication control section 20, a handover permission instructing section 40, a handover permission determining section 50, a user preference data input section 70, a user preference data storage section 80 and a connection destination determining section 60. The application 10 is a communication application for performing a data communication through the wireless communication interface section 30, and it itself issues the instructions with regard to the handover. The communication control section 20 executes a connecting process to the network through the wireless communication interface section 30, a monitoring process of a reception signal level, and a transmitting/receiving process of data between the application 10 and the wireless communication interface section 30. The handover permission instructing section 40 outputs a handover permission notice and inhibition notice based on data with regard to the handover from the application 10. The handover permission determining section 50 determines permission or inhibition of the handover based on the handover permission notice and the inhibition notice from the handover permission instructing section 40 and a stay time period during which the handover permission determining section 50 is set to a handover inhibition state. The user preference data input section 70 inputs an identifier name of a connection destination base station, a priority for it and a network data. The user preference data storage section 80 holds a data supplied from the user preference data input section 70 or a pre-stored data. The connection destination determining section 60 is connected to the communication control section 20, the handover permission determining section 50 and the user preference data storage section 80, and determines the base station to which the wireless communication terminal is to be connected, and then issues the connection request on the communication control section 20.

The communication control section 20 has a part 20A corresponding to the first detecting section 110 and a part 20B corresponding to the communication control section 150. The handover permission instructing section 40 has a part 40A corresponding to the second detecting section 120. The handover permission determining section 50 has a part 50A corresponding to the third detecting section 130 and a part 50B corresponding to the determining section 140. The connection destination determining section 60 has a part 60A corresponding to the determining section 140.

The application 10 is a communication application program for performing the data communication through the wireless communication interface section 30. A kind of the application 10 is not limited. However, the application 10 is desired to be a connectionless communication using, especially, UDP (User Datagram Protocol), which is especially effective in a speech communication application, a television telephone application and a video reception application, which require real time properties. Moreover, the application 10 has a function of controlling the handover permission instructing section 40 to instruct the handover permission or inhibition to the handover permission determining section 50 at a timing based on the communication content in the application itself. For example, when the application 10 is the speech communication application, the application 10 determines the speech interval and the silence interval in the speech communication, outputs a handover inhibition instruction in response to start of the speech interval and outputs a handover permission instruction in response to end of the speech interval.

The communication control section 20 has a function of executing the connecting process to the network 4 in response to the request from the connection destination determining section 60. Specifically, the communication control section 20 has a function of executing a series of processes such as retrieval of a base station, the connection negotiation with the base station, and the encoding and decoding of data, and a function of notifying the retrieval result of the base station to the connection destination determining section 60. Moreover, the communication control section 20 holds a threshold level set by the connection destination determining section 60. The communication control section 20 has a function of comparing the threshold level with the reception signal level periodically obtained by the wireless communication interface section 30, and outputting a notice to the connection destination determining section 60 when the reception signal level is lower than the threshold level. It should be noted than threshold levels other than the threshold level set by the connection destination determining section 60 may be stored in advance.

The wireless communication interface section 30 has a function of wirelessly transmitting data received from the communication control section 20 to the base station and a function of transferring the data received from the base station to the communication control section 20. That is, the wireless communication interface section 30 is mainly used at the time of communication with the base station. Moreover, the wireless communication interface section 30 has a function of collecting a wireless electric wave situation, namely, the reception signal level, and a data communication state, namely, an error rate, and the number of data that are normally transmitted, and periodically notifying them to the communication control section 20.

The handover permission instructing section 40 has a function of instructing whether or not the handover may be performed, to the handover permission determining section 50. Specifically, when receiving the handover permission notice from the application 10, the handover permission instructing section 40 gives the handover permission instruction to the handover permission determining section 50, and when receiving the handover inhibition notice from the application 10, gives the handover inhibition instruction to the handover permission determining section 50.

When receiving a handover permission notice request from the connection destination determining section 60 to request notification of the handover permission state at the time of change to the handover permission state, the handover permission determining section 50 determines the handover permission or inhibition based on the handover permission instruction or the handover inhibition instruction notified by the handover permission instructing section 40, and a stay time period in the handover inhibition state. When receiving the handover permission notice request from the connection destination determining section 60 in case of the handover permission state, the handover permission determining section 50 notifies the handover permission notice to the connection destination determining section 60 so as to consecutively permit the handover. Also, when receiving the handover permission notice request from the connection destination determining section 60 in case of the handover inhibition state in which the handover is not permitted, the handover permission determining section 50 outputs the handover permission notice to the connection destination determining section 60 at the time of the change to the handover permission state, or at the time when the stay time period in the handover inhibition state exceeds a predetermined time even if the change to the handover permission state is not performed.

The connection destination determining section 60 has a function of determining the base station to be connected through the wireless communication interface section 30. The connection destination determining section 60 requests the communication control section 20 to retrieve the currently connectable base stations, and acquires the retrieval result of the base stations, and compares the retrieval result and a connection destination identification name held by the user preference data storage section 80, and determines the base station having a high priority, in consideration of a priority data stored together with the connection destination identification name, and then issues the connection request for the selected base station to the communication control section 20. For example, in case of WLAN, The connection destination determining section 60 issues a scan request of an access points to the communication control section 20 and determines the connection destination in an order of the higher priority based on the retrieval result of the access points and the priorities of the user preference data held by the user preference data storage section 80, and then issues to the communication control section 20, the connection request together with the network data (ESSID, a connection method, an encoding method, an data necessary for an authentication) which is similarly obtained from the user preference data storage section 80 and required to be connected to the selected connection destination.

Moreover, the connection destination determining section 60 is responsible for determining the switching of the connection from the current connection destination to a different base station, when there is a base station connected through the wireless communication interface section 30. The connection destination determining section 60 sets a threshold level in the wireless communication interface section 30 to the communication control section 20, as necessary. When receiving a reception signal level lowered notice indicating that the reception signal level of the reception signal from the communication control section 20 to the wireless communication interface section 30 becomes lower than the threshold level, the connection destination determining section 60 outputs the handover permission notice request to the handover permission determining section 50, to notify its fact at the time of the switching to the handover permission, in order to determine the permission or inhibition of the handover.

When receiving the handover permission notice from the handover permission determining section 50, the connection destination determining section 60 starts the handover process. This handover process is a process of retrieving the connectable base stations, acquiring the retrieval result of the base stations, and determining the connection destination base station having a high priority through the comparison between the retrieval result and a connection destination identification name held by the user preference data storage section 80, and also issuing the connection request for the selected base station to the communication control section 20 and then connecting to a new base station. This is similar to a process of firstly connecting to the base station. At this time, basically, the handover destination candidates do not include the base station currently in connection in which the reception signal level is reduced, in a case other than a next case. The case where the handover destination candidates include the base station currently in connection is a case where the transiently reduced reception signal level is recovered to a degree that exceeds the threshold level when the handover permission notice is received from the handover permission determining section 50. In this case, the handover process may be stopped and the base station currently in connection may be used in its original state.

Also, when the handover has occurred, the process of retrieving the base stations, acquiring the retrieval result of the base stations and determining the network of the handover destination through the comparison between the retrieval result and the user reference data may be completed prior to receiving the handover permission notice from the handover permission determining section 50. For example, when it is notified that the reception signal level becomes lower than the threshold level, the process may be started to determine the base station of the handover destination. In this case, as soon as the handover permission notice is received from the handover permission determining section 50, the connection request to the selected base station can be issued, resulting in the completion of the connecting process to the new base station in a shorter time.

The user preference data input section 70 has a function of storing the data of the network such as the priority with respect to the base station desired to be connected, in the user preference data storage section 80, when being connected through the wireless communication interface section 30 to the network, and stores the connection destination identification name and the priority for it in the user preference data storage section 80. For example, when the connection destination is WLAN, ESSID (Extended Service Set ID) is used as the connection destination identification name, and the ESSID is set in the user preference data storage section 80 in the order of desire of the connection. As the connection destination identification name, BSSI (Basic Service Set ID) other than ESSID may be used. A list in which the connection destination identification names are arranged in the priority order in advance may be sent to the user preference data storage section 80, or they may be individually set one by one. Also, in addition to the connection destination identification name, the data necessary for the connection may be set in the user preference data storage section 80. The user preference data input section 70 may be configured to have a user interface to receive an input from the user. Also, the user preference data input section 70 may be configured to input a data obtained when the application in the wireless communication terminal communicates with an apparatus on the network.

The user preference data storage section 80 has a function of storing a list of the connection destination identification names arranged in the order of priorities of the base stations desired to be connected, when the wireless communication terminal is connected through the wireless communication interface section 30 to the base station. The content to be stored is stored in the user preference data storage section 80 by the user preference data input section 70 and read from it by the connection destination determining section 60. Also, the content to be stored may be stored by the user preference data input section 70 or may be stored in advance. The user preference data storage section 80 may store not only the name to identify the connection destination but also the data necessary for the connection to the base station.

In FIG. 2, a recording medium 90 such as a magnetic disc can be read by a computer, and stores software programs. The wireless communication terminal 1 attains the above processes of the respective sections, when CPU (Central Processing Unit) (not shown) transfers the programs stored in the recording medium 90 to RAM (Random Access Memory) (not shown) and executes them.

The operation of the wireless communication system according to the first exemplary embodiment of the present invention will be described below in detail with reference to FIG. 1 to FIG. 5. It should be noted that the processes shown in FIGS. 3 to 5 are attained, when the CPU in the wireless communication terminal 1 transfers the programs in the recording medium 90 to the RAM and executes them.

At first, the wireless communication terminal 1 retrieves the base stations to be connected to the network 4 and acquires the retrieval result. The retrieval result and the list of the base station identification names which are stored in the user preference data storage section 80 of the wireless communication terminal 1 and arranged in the order of priorities are compared in the order of higher priority. When there is a coincident base station, the connection to the base station is determined, and the connection negotiation with the base station is performed, to allow the data communication. For example, the base station 2 is determined, and the connection negotiation with the base station 2 is performed. Thus, the wireless communication terminal 1 can communicate with an apparatus on the network 4 through the base station 2 (C1 and C2 in FIG. 5).

Figure 5:
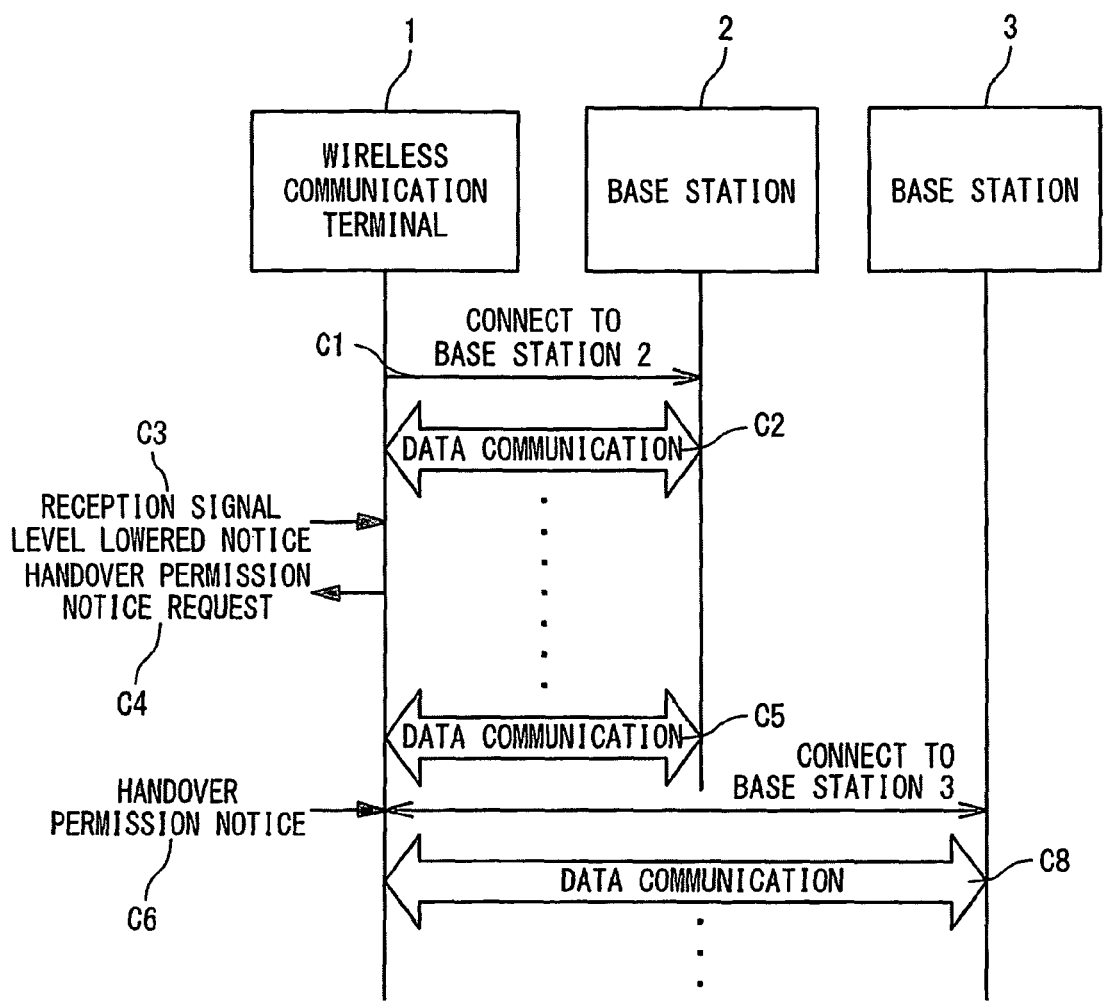
FIG. 5 is a sequence diagram showing an operation of the wireless communication terminal in the first exemplary embodiment of the present invention.

The negotiation between the wireless communication terminal 1 and the base station 2 may be performed through an encoded communication using a WEP (Wired Equivalent Privacy) key only in the IEEE 802.11 connection negotiation, or may be performed through the encoded communication using the WEP key dynamically set after the permission of the connection, as the result of the IEEE 802.1x authentication, or may be performed through connection whose security is more enhanced by using WPA (Wi-Fi Prevented Access) or WPA2 (WPA version 2) (C1 in FIG. 5).

Figure 3:
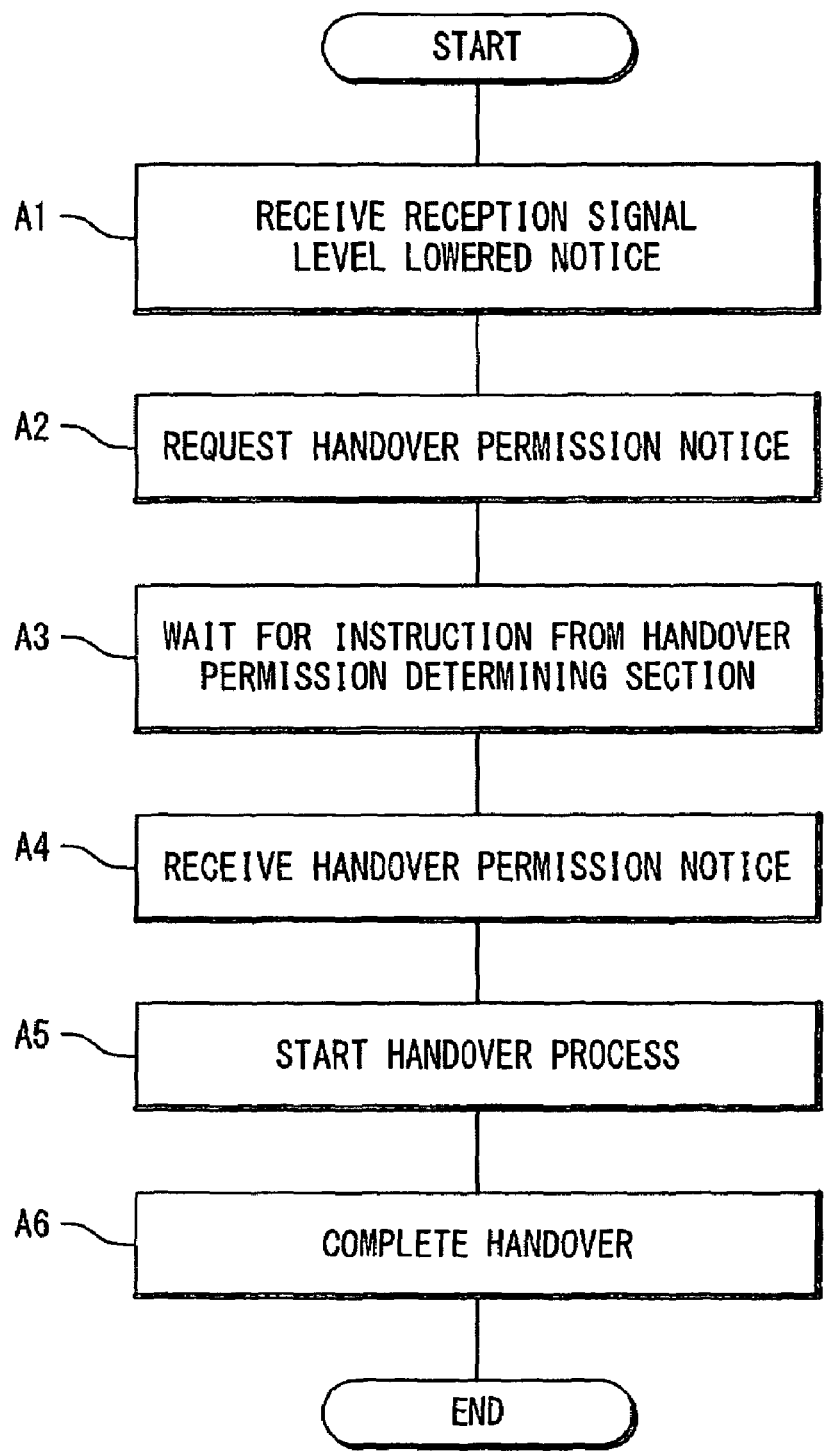
FIG. 3 is a flowchart showing a process example of a connection destination determining section of the wireless communication terminal in the first exemplary embodiment of the present invention.
Figure 4:
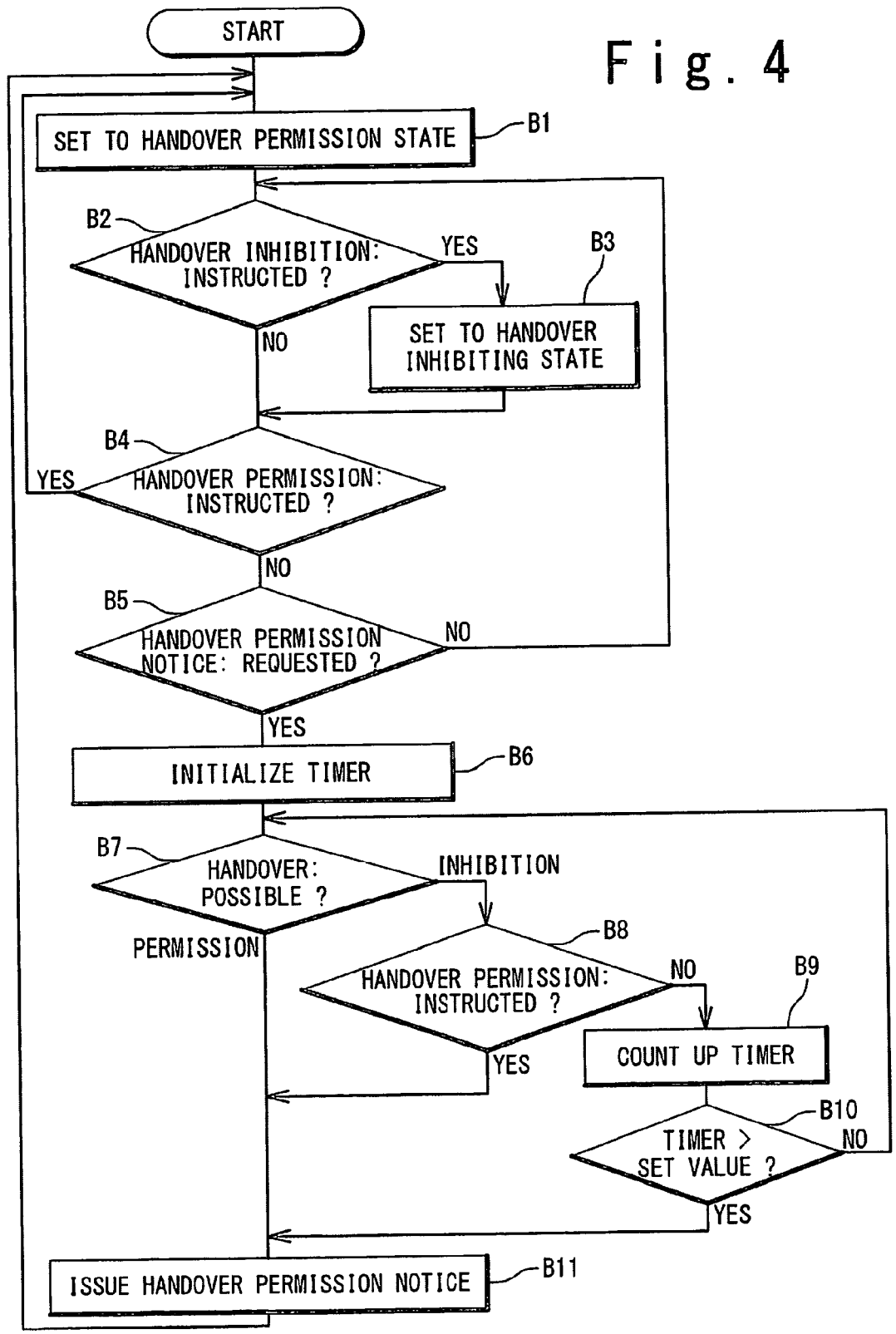
FIG. 4 is a flowchart showing a process example of a handover permission determining section of the wireless communication terminal in the first exemplary embodiment of the present invention.

Next, when the wireless communication terminal 1 during the data communication moves so that the level of a reception signal from the base station 2 currently in connection is lowered, the communication control section 20 in FIG. 2 issues the reception signal level lowered notice to the connection destination determining section 60 at the timing when the reception signal level becomes lower than a threshold level set for the communication control section 20 (Step A1 in FIG. 3, C3 in FIG. 5).

When receiving the reception signal level lowered notice, the connection destination determining section 60 issues the handover permission notice request to the handover permission determining section 50 (Step A2 in FIG. 3, Step B5 in FIG. 4, C4 in FIG. 5). When issuing the handover permission notice request, the connection destination determining section 60 becomes in a waiting state for the handover permission notice issued from the handover permission determining section 50 (Step A3 in FIG. 3).

The handover permission determining section 50 is set to the handover permission state when it is active (Step B1 in FIG. 4) and waits for the handover permission notice or inhibition notice from the handover permission instructing section 40, and the handover permission notice request from the connection destination determining section 60 (Steps B2 to B4 in FIG. 4). When receiving the handover inhibition notice from the handover permission instructing section 40, the handover permission determining section 50 is set to the handover inhibition state (Step B3 in FIG. 4). After that, when receiving the handover permission notice, the handover permission determining section 50 is set to the handover permission state (Step B4 and Step B1 in FIG. 4).

When receiving the handover permission notice request from the connection destination determining section 60, the handover permission determining section 50 initializes a timer, which counts the staying time period in the handover inhibition state to "0" (Step B6 in FIG. 4) and then checks the handover state kept (Step B7 in FIG. 4). When the handover state is the handover permission state, the handover permission determining section 50 issues the handover permission notice to the connection destination determining section 60 (Step B11 in FIG. 4, C6 in FIG. 5). If at the step B7, the handover state is the inhibition state, while counting up the timer for each predetermined time (Step B9 in FIG. 4), the handover permission determining section 50 waits for the handover permission instruction from the handover permission instructing section 40 (Step B8 in FIG. 4, C6 in FIG. 5).

When receiving the handover permission instruction, the handover permission determining section 50 issues the handover permission notice to the connection destination determining section 60 at that time (Step B11 in FIG. 4, C6 in FIG. 5). Also, when the timer exceeds a preset timeout value (Step B10 in FIG. 4), the handover permission determining section 50 issues the handover permission notice to the connection destination determining section 60 without any handover permission instruction from the handover permission instructing section 40 (Step B11 in FIG. 4, C6 in FIG. 5). When issuing the handover permission notice, the handover permission determining section 50 is set to the initial handover permission state and returns to the initial state (Step B1 in FIG. 4).

The timeout value of the timer is set to be shorter than the shortest time from the time when the reception signal level from the base station 2 currently in connection becomes lower than the threshold level to the time when the data communication disabled state is set. A degree to which the time is shortened is determined based on a degree to which a margin is given. Here, the timer may be based on any of a count-up method and a count-down method. In case of the count-down method, the timeout value is set for the initial value. For example, when the timeout value is 30 seconds, the value of 30 seconds is set as the initial value. The timer is counted down during the handover inhibition state, and when its value becomes 0, the determination is made, similarly to a case of receiving the handover permission instruction, and the handover permission notice is issued to the connection destination determining section 60 without any handover permission instruction from the handover permission instructing section 40. Also, the timeout value is notified together with the handover permission notice request from the connection destination determining section 60 or may be held in advance.

When receiving the handover permission notice from the handover permission determining section 50, the connection destination determining section 60 starts the handover process (Steps A4, A5 in FIG. 3, C7 in FIG. 5). Here, the handover process starts with the retrieval of the base station, similarly to the first connection, and then performs the determination of the connection destination base station based on the user preference data and the connection negotiation to the base station. Consequently, the handover process to the new base station is completed (Step A6 in FIG. 3, C8 in FIG. 5). For example, it is supposed that, the wireless communication terminal is firstly connected to the base station 2 and performs a data communication, and then performs retrieval of the base stations after the reception of the handover permission notice, and as the result of the comparison with the user preference data, the wireless communication terminal is connected to the base station 3. In such a case, the wireless communication terminal 1 performs the connection negotiation with the base station 3 and starts the data communication (C7, C8 in FIG. 5). The wireless communication terminal 1 may release the connection to the base station 2 and stop the data communication, as necessary, prior to the connection negotiation with the base station 3.

Similarly to the case of the base station 2, the negotiation between the wireless communication terminal 1 and the base station 3 may be performed through the encoded communication based on the WEP (Wired Equivalent Privacy) key only under the IEEE 802.11 connection negotiation, or may be performed through the encoded communication based on the WEP key that is dynamically set in response to the permission of the connection, as the result of the IEEE 802.1x authentication, or may be performed through the connection whose security is made higher by the use of the WPA (Wi-Fi Prevented Access), WPA2 (WPA version 2) (C7 in FIG. 5).

As mentioned above, a process that determines the base station of the handover destination by retrieving the base stations, acquiring the retrieval result of the base stations and comparing the retrieval result and the user preference data may be completed prior to receiving a notice indicative of the permission of the handover from the handover permission determining section 50. For example, the base station of the handover destination may be determined by starting the process when the fact that the reception signal level becomes lower than the threshold level is received (Step A1 in FIG. 3). Thus, as soon as the handover permission notice is received from the handover permission determining section 50, the connection request to the selected base station can be performed, resulting in the connecting process to the network being completed in the shorter time.

The operation of the application 10 will be described below by using FIG. 6.

The application 10 issues the handover permission and inhibition instructions to the handover permission determining section 50 through the handover permission instructing section 40 at the timing according to the communication content in the application. For example, when the application 10 is assumed to be a speech communication application, the speech communication application 10 is configured to determine a speech interval or a silence interval after the speech communication starts, and issues the handover inhibition instruction (D2) at the beginning of the speech interval, namely, the interval in which the speech flows (between D1-1 and D1-2), and issues the handover permission instruction (D3) when the interval in which the speech flows is ended (D1-2).

In a method in which the speech communication application 10 determines the speech interval or the silence interval, the determination may be performed based on the amplitude level of a speech waveform. Specifically, the speech interval or silence interval during the data communication is determined on the basis of the magnitude of the speech waveform when the communication data is regarded as the speech data, and the handover inhibition instruction is issued at the beginning of the speech interval, and the handover permission instruction is issued at the ending of the speech interval, namely, the beginning of the silence interval. Also, in the method in which the speech communication application 10 determines the speech interval or the silence interval, speech recognition may be performed so as to determine the beginning and ending of a context on the basis of the result of meaning analysis of the context. Specifically, the context is determined from the speech data in the data communication by using the speech recognition and performing the meaning analysis. Then, at the beginning of the context as the beginning of the speech interval, the handover inhibition instruction is issued, and at the ending of the context as the ending of the speech interval, the handover permission instruction is issued. In this way, the present invention does not require a particular determining method, and any determining method may be used, and this can be applied.

When the speech again begins to flow, the handover inhibition instruction is issued (D5) at first (D4-1). When the interval (between D4-1 and D4-2) during which the speech flows is ended (D4-2), the handover permission instruction (D6) is issued. In the speech communication application 10, hereinafter, the similar operation is performed during the speech communication.

The relation between the operation of the application 10 and the handover operation of the wireless communication terminal 1 will be described. For example, when the handover permission determining section 50 receives the handover permission notice request (D7-1) in FIG. 6, the handover permission notice (D7-2) is immediately issued to the connection destination determining section 60 since the handover permission determining section 50 is in the handover permission state at present. Therefore, as soon as the lowering of the reception signal level is generated, the wireless communication terminal 1 starts the handover process.

Figure 6:
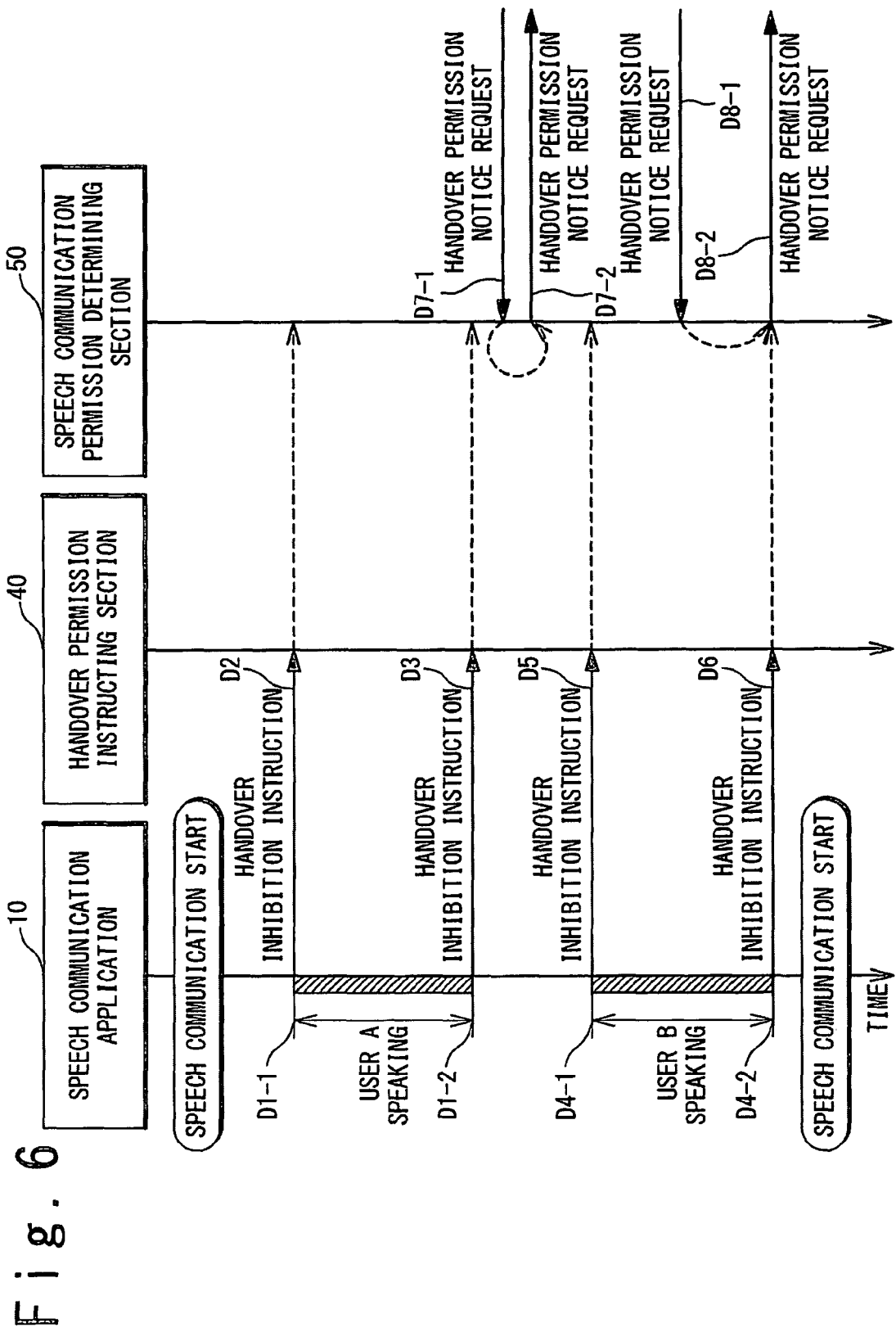
FIG. 6 is a sequence diagram showing an example of a process of a communication application of the wireless communication terminal in the first exemplary embodiment of the present invention.

Next, when the handover permission determining section 50 receives the handover permission notice request (D8-1) in FIG. 6, the handover permission determining section 50 waits for the switching to the handover permission state, since the handover permission determining section 50 is in the handover inhibition state at present. When receiving the handover permission instruction (D6) from the handover permission instructing section 40, the handover permission notice (D8-2) is issued to the connection destination determining section 60, since the handover permission determining section 50 is set to the handover permission state at that time. Thus, the wireless communication terminal 1 starts the handover process when the handover permission instruction is issued, without starting the handover process until the application 10 issues the handover permission instruction, after the generation of the lowering in the reception signal level. However, if the wireless communication terminal 1 continues to wait for the handover permission instruction anymore when the timer exceeds a timeout value because the handover permission instruction is not issued for a long time, the reception signal level is lowered to a level corresponding to the data communication disabled state so that the handover cannot be performed. Therefore, the handover permission notice is issued to the connection destination determining section 60 without any handover permission instruction.

In the foregoing descriptions, the communication control section 20 notifies the reception signal level lowered notice to the connection destination determining section 60, when the reception signal level becomes lower than a threshold level. In addition thereto, when the reception signal level becomes higher than a threshold level, the communication control section 20 may be configured to notify a reception signal level rise notice. At this time, the connection destination determining section 60 receives the reception signal level lowered notice, and issues the handover permission notice request to the handover permission determining section 50 and is set to the state of waiting for the handover permission notice. When receiving the reception signal level risen notice in this state, the connection destination determining section 60 performs an operation of withdrawing the already-issued handover permission notice request. That is, this case implies that the handover operation is not performed.

Also, in the foregoing descriptions, the application 10 is configured to instruct the handover permission and inhibition instructions at the boundary between the speech interval and the silence interval. However, the application 10 can be configured such that simultaneously with the speech communication start, the handover inhibition is issued, and together with the ending of the speech communication, the handover permission instruction is issued.

Also, in the foregoing descriptions, the application 10 is configured to issue the handover permission and inhibition instructions during the speech communication. However, it can be used in a control plane during the signaling to make a speech call, namely, other than a data plane. For example, in the speech communication application, when the speech communication is started, SIP (Session Initiation Protocol) is used to perform preparation of the speech communication.

This is to call up a partner in making the call and perform the negotiation of a speech CODEC (COmpression/DECompression) to be used. For example, when transmitting an INVITE packet to start the speech communication, the wireless communication terminal 1 receives a [100 Trying] packet indicating continuation of a process from an SIP server, and receives a [180 Ringing] packet indicating an in-call state from the partner and receives a [200 OK] packet indicating that the partner answers the call and then returns an ACK packet implying a reception confirmation for it. Consequently, the preparation of the execution of the speech communication is completed.

Here, when the handover is performed during the foregoing signaling so that an IP address given to the wireless communication terminal is changed, the speech communication cannot be carried out unless this signaling is again performed. Thus, the signaling to make the speech call is configured in such a manner that the handover inhibition is instructed at the time of starting the signaling, namely, at the time of transmitting the INVITE packet, and the handover permission instruction is issued at the completion time of the signaling, namely, at the time of transmitting the ACK packet responding to the [200 OK] packet reception. Thus, it is possible to reduce that a signaling process is failed and interrupted. Also, the same thing can be similarly applied to a case that the wireless communication terminal 1 is located on the side of receiving the speech call. It should be noted that other than the speech communication start, the handover inhibition can be configured to be instructed in the intervals until the completion with the ACK after the suspension in which reINVITE is used, and until the completion with the ACK after the release of the suspension, and until the transfer completion after the transfer with REFER. Also, in this case, the effect of reducing the failure of the signaling process can be obtained.

The foregoing content can be applied not only to the speech communication application but also to all of the applications using other protocols. For example, it is supposed that the application is a VPN (Virtual Private Network) client application and that an IPsec (IP Security) connection is tried. When the execution of the handover results in the changes in the IP address of the wireless communication terminal 1 and the like during the connecting process based on the IPsec, the connecting process based on the IPsec must be re-performed from the beginning thereof after the handover. For this reason, the usage in which the handover is inhibited is possible and useful during the connecting process such as the signaling protocol for a call control or a control protocol to secure a communication path through the VPN.

In the foregoing descriptions, the application 10 is the speech communication application. However, the application 10 may be a program (a video receiving application and a speech receiving program) for receiving a broadcast distributed based on a predetermined broadcast program (a broadcast table in which a distribution broadcast and its distribution time zone are defined). In this case, since a broadcast program (a video distribution program or a speech distribution program) is determined in advance as the wireless communication terminal 1, it is possible to preliminarily determine a time zone during which the handover is permitted. For example, although the broadcast is defined depending on a time zone in the broadcast program, there is also a case that the handover between two broadcasts (i.e., after the end of one broadcast and before the start of the next broadcast, as opposed to during any broadcast) has less influence on the quality, as compared with the execution of the handover during the broadcast. In short, it is possible to configure that the handover is inhibited during the broadcast and the handover is permitted between two broadcasts (i.e., after the end of one broadcast and before the start of the next broadcast, as opposed to during any broadcast). Of course, in addition to such configuration, it is possible to configure that it is used that the program is defined in advance, to preliminarily obtain the different timing.

It should be noted that the connection destination determining section 60 may contain a method of selecting the base station having the highest electromagnetic wave intensity as the connection destination, from the reception result of the notice data issued by the base station, independent of the user preference, as the method of selecting the base station of the handover destination.

The effect of the wireless communication system according to the first exemplary embodiment of the present invention will be described below.

The wireless communication system according to the first exemplary embodiment of the present invention is configured such that the application 10 instructs the handover permission and inhibition for the handover execution timing caused through the lowering of the reception signal level in the wireless communication terminal 1, and the handover permission and inhibition intervals are consequently provided. Conventionally, at the time of the generation of the lowering of the reception signal level, the handover process is executed independent of the data communication state and communication content of the application 10. However, the handover process can be started at the timing corresponding to the communication state of the application 10. Thus, the handover can be performed at the timing at which the influence on the quality is little from the viewpoint of the application 10, thereby obtaining the effect of reducing the quality deterioration for the user related to the handover.

Also, the wireless communication system according to the first exemplary embodiment of the present invention is configured in such a manner that in the handover permission determining section 50 in the wireless communication terminal 1, a timeout value to switching from the handover inhibition interval to the handover permission period is defined, to avoid the consecutive staying in the handover inhibition state. For this reason, it is possible to prevent the occurrence of the situation in which, the handover cannot be performed, since the handover permission instruction is not issued after the handover inhibition instruction from the application 10 so that the reception signal level is reduced to a level corresponding to the data communication disabled state.

Also, the wireless communication system according to the first exemplary embodiment of the present invention is configured in such a manner that in the wireless communication terminal 1, although the execution of the handover is once determined because of the lowering of the reception signal level, the handover is not performed when the rise of the reception signal level is detected prior to the reception of the handover permission. Thus, even if the reception signal level is recovered prior to the reception of the handover permission after the determination of the execution of the handover, the execution of the handover can be prevented. Therefore, a wasteful handover process can be prevented, which consequently achieves the effect of improving the data communication quality in the application.

Also, the wireless communication system according to the first exemplary embodiment of the present invention is further configured in such a manner that the handover permission and inhibition instructions can be issued at the timing corresponding to the communication content in each application 10. Thus, the respective applications 10 can determine the respective unique instruction timings. Also, even in any kind of the application 10, the effect of reducing the quality degradation can be obtained in relation to the handover. That is, it is the communication application 10 itself that issues the handover permission and inhibition instructions. Accordingly, the communication application 10 has both of a data related to the timing when the handover permission instruction is issued in accordance with the data communication content in itself and a data related to the timing when the handover inhibition instruction is issued. Therefore, the handover permission and inhibition instructions can be issued in accordance with the data with regard to the timing on the basis of the communication content.

Also, the wireless communication system according to the first exemplary embodiment of the present invention can control the handover timing not only in the course while the application 10 communicates the application data, but also in the control plane such as the signaling protocol for the call control as mentioned above and the control protocol to secure the communication path through the VPN. Thus, it is possible to reduce the re-trial of the signaling that is caused due to the handover generation during the signaling. As a result, it is possible to attain the effect of improving the data communication quality that results from the reduction in a communication shutoff period.

Also, in the wireless communication system according to the first exemplary embodiment of the present invention, in case of a video data receiving application or speech data receiving application, it is possible to preliminarily determine a period during which the handover is permitted or inhibited, such as a case that a period between the broadcasts is determined to be the handover permission interval, based on a predetermined broadcast program (a picture distribution program or a speech distribution program). As a result, it is possible to perform the base station retrieval at a higher precision by effectively using the handover permission interval. Moreover, the effect is obtained in which the wireless communication terminal can suitably perform the handover on the base station whose communication state is better.

[Second Exemplary Embodiment]

The wireless communication system according to the second exemplary embodiment of the present invention differs from the first exemplary embodiment in that a communication control section 20 in FIG. 2 has another threshold level lower than a threshold level similar to the first exemplary embodiment, that it is notified to the connection destination determining section 60 that the reception signal level becomes lower than at least one of two kinds of threshold levels, and that the handover is started as soon as the connection destination determining section 60 receives the notice from the communication control section 20 indicating that the reception signal level is reduced to be lower than the lower threshold level. The second exemplary embodiment is similar to the first exemplary embodiment in configuration other than the above configuration.

The communication control section 20 in this exemplary embodiment further holds another threshold level. In order to clarify a difference from the threshold level in the first exemplary embodiment, the threshold level in the first exemplary embodiment is referred to as a threshold level A, and another threshold level added in the second exemplary embodiment is referred to as a threshold level B. When the threshold level B is set to a value at which the data communication can be barely performed, the maximum effect can be obtained. However, the threshold level B may be set to a value slightly greater than the above value by a margin. The communication control section 20 compares the reception signal level, which is periodically obtained from the wireless communication interface section 30, with the threshold levels A and B. When the reception signal level becomes lower than the threshold level A, the communication control section 20 notifies it to the connection destination determining section 60, and when the reception signal level becomes lower than the threshold level B, notifies it to the connection destination determining section 60. The threshold level B is lower than the threshold level A. It should be noted that the threshold levels A and B may be held in advance, other than a case that they are set by the connection destination determining section 60.

The connection destination determining section 60 in FIG. 2 performs the following operation in addition to the operation in the first exemplary embodiment. The connection destination determining section 60 sets the threshold level B of the wireless communication interface section 30 to the communication control section 20, as necessary. When receiving from the communication control section 20 the reception signal level lowered notice B informing that the signal level received by the wireless communication interface section 30 becomes lower than the threshold level B, the connection destination determining section 60 immediately starts the handover process, independent of the handover permission inhibition state of the handover permission determining section 50, namely, without waiting for the handover permission instruction. This point differs from the operation in the first exemplary embodiment. At this time, the connection destination determining section 60 may issue the notice to the handover permission determining section 50 as necessary, to indicate that the handover permission notice request is canceled.

The operation of the wireless communication system according to the second exemplary embodiment of the present invention will be described below in detail with reference to FIGS. 7 and 8. It should be noted that a process shown in FIG. 7 is attained because the CPU of the computer configuring the communication terminal 1 transfers the programs stored in the recording medium 90 to the RAM and executes them.

The wireless communication terminal 1 firstly performs the connection negotiation with the base station 2 or 3. The operation of allowing the communication with a communicating apparatus on the network 4 through the base station is similar to the first exemplary embodiment.

In the communication control section 20 in the wireless communication terminal 1, when the movement of the terminal 1 causes the lowering of the reception signal level (F1 in FIG. 8) from the base station currently in connection, a reception signal level lowered notice A is issued to the connection destination determining section 60 at the timing (F2 in FIG. 8) at which the reception signal level becomes lower than the threshold level A set for the communication control section 20. Moreover, a reception signal level lowered notice B is issued to the connection destination determining section 60 at the timing (F3 in FIG. 8) when the reception signal level becomes lower than the threshold level B set for the communication control section 20.

Figure 7:
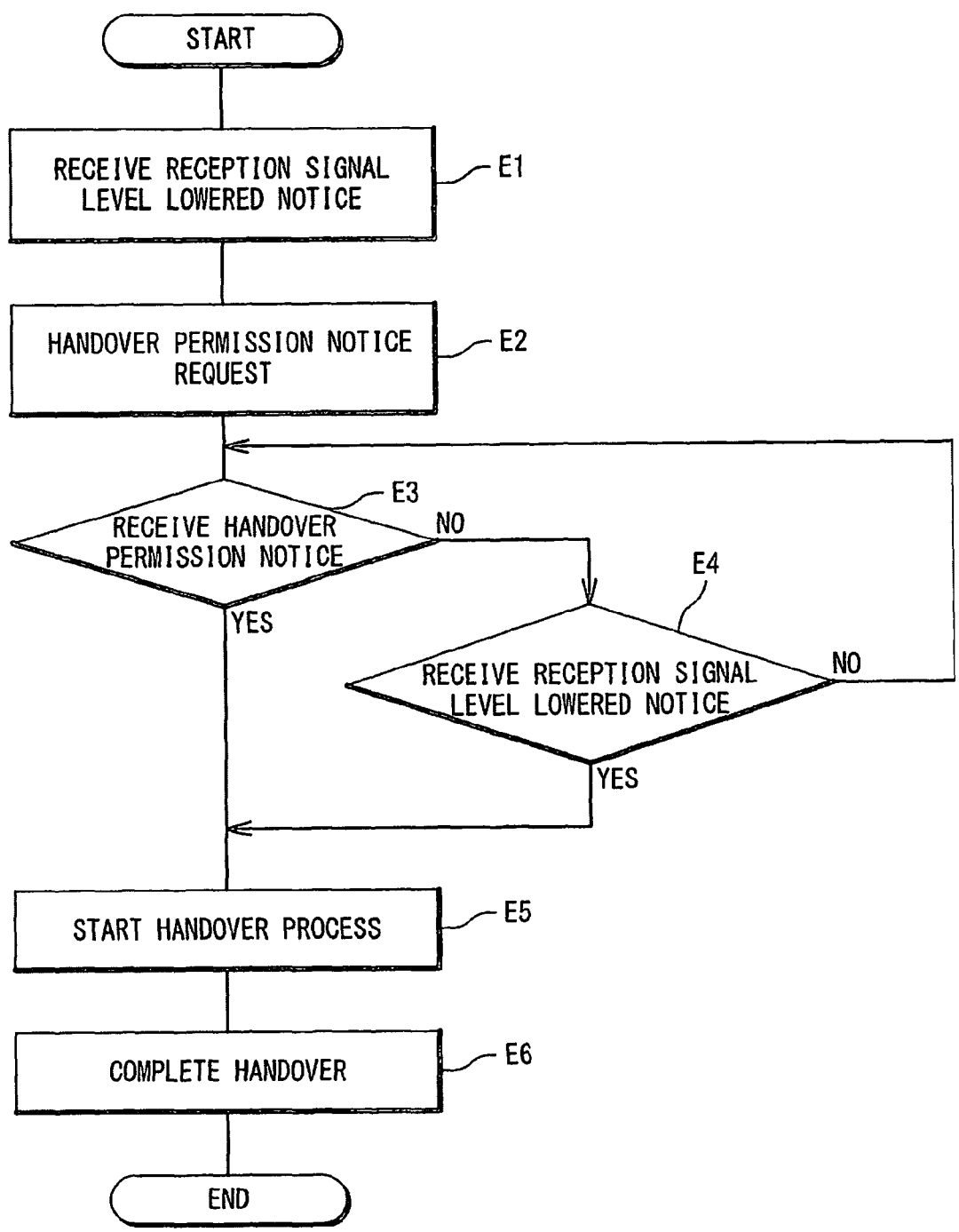
FIG. 7 is a flowchart showing a process example of a connection destination determiner of a wireless communication terminal in a second exemplary embodiment of the present invention.
Figure 8:
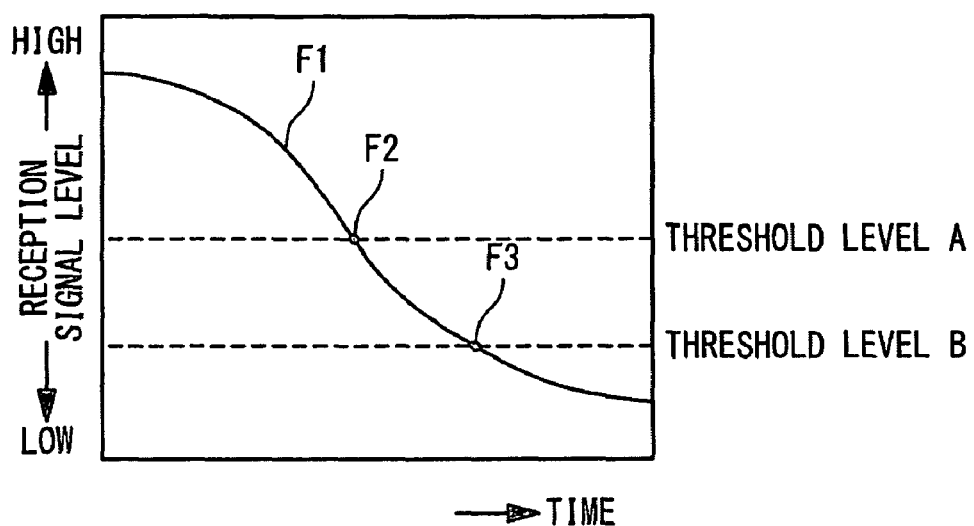
FIG. 8 is a diagram showing a relation between a temporal change in a reception signal level in the second exemplary embodiment of the present invention and a threshold level A and a threshold level B.

When receiving the reception signal level lowered notice A, the connection destination determining section 60 in the wireless communication terminal 1 issues the handover permission notice request to the handover permission determining section 50 (Step E1, Step E2 in FIG. 7). Then, the connection destination determining section 60 waits for the reception of the handover permission notice from the handover permission determining section 50 (Step E3 in FIG. 7) and starts the handover process when receiving the handover permission notice (Step E5 in FIG. 7). This point is similar to the first exemplary embodiment. However, when the reception signal level lowered notice B is received by the communication control section 20 in the course of waiting for the handover permission notice (Step E4 in FIG. 7), the handover process is immediately started without any handover permission notice (Step E5 in FIG. 7). That is, the threshold level B implies the threshold level at which the handover is required to be instantly performed without giving any delay for the handover execution to the connection destination determining section 60. When starting the handover process by receiving the reception signal level lowered notice B without receiving the handover permission notice, the connection destination determining section 60 may issue a notice of cancelling the handover permission notice request already issued to the handover permission determining section 50, as necessary.

Figure 9:
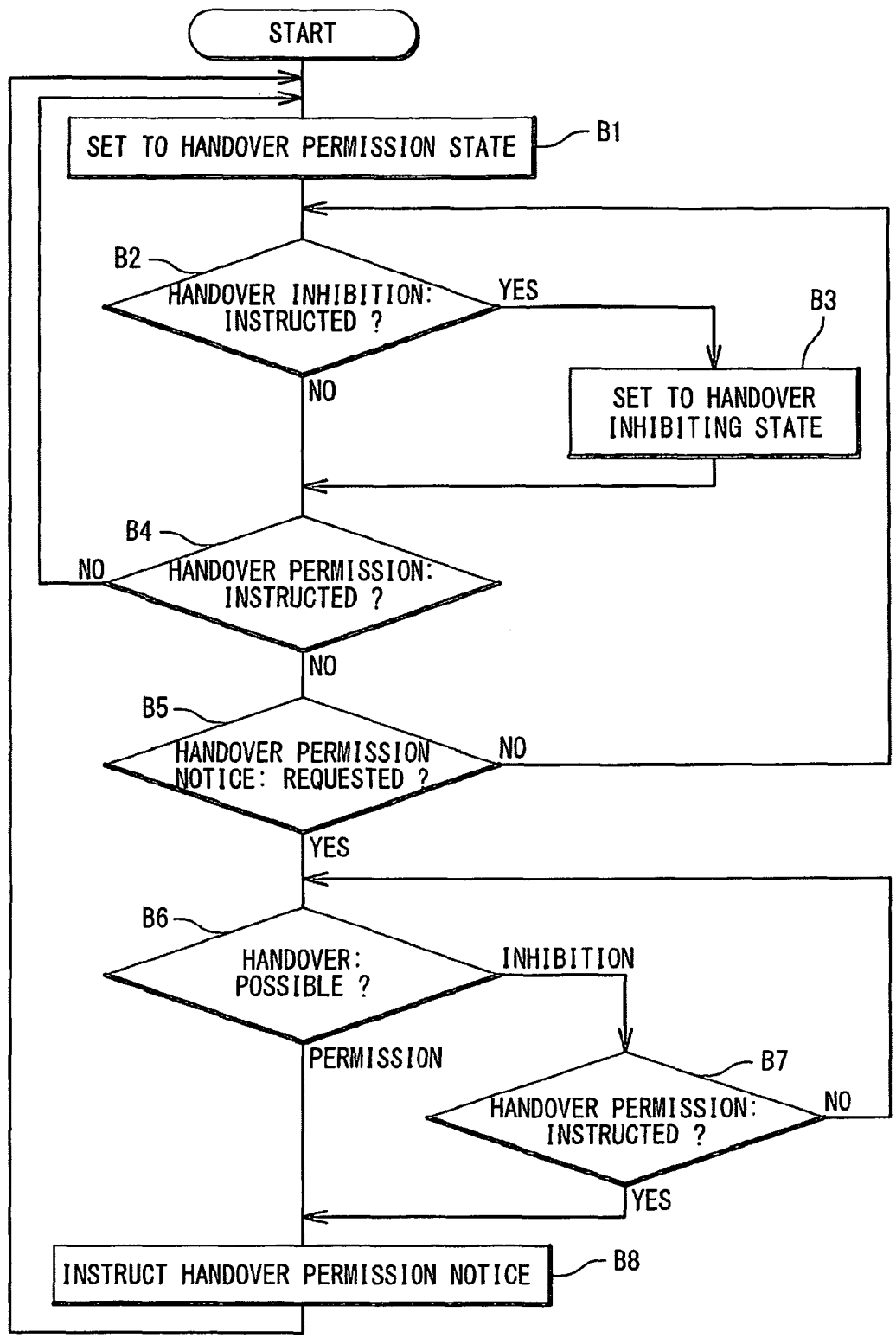
FIG. 9 is a flowchart showing a process example of a handover permission determining section of a wireless communication terminal in a modification of the second exemplary embodiment of the present invention.

It should be noted that the handover permission determining section 50 may perform the operation shown in the flowchart of FIG. 4, similarly to the first exemplary embodiment, or may perform the operation shown in the flowchart of FIG. 9, in which the steps B6, B9 and B10 related to the timer are omitted from the flowchart shown in FIG. 4.

The effect of the wireless communication system according to the second exemplary embodiment of the present invention will be described below. According to the wireless communication system according to the second exemplary embodiment of the present invention, the following effect is attained in addition to the effect similar to the effect in the first exemplary embodiment.

The wireless communication system according to the second exemplary embodiment of the present invention is configured in such a manner that in addition to the threshold level A, the threshold level B lower than it is set, and when the reception signal level becomes equal to or less than the threshold level A, the communication control section 20 in the wireless communication terminal 1 starts the control of the switching to the handover, under the condition issuance of the handover permission instruction from the application 10, and when the handover permission instruction is inhibited from being issued from the application 10 due to any reason, forcedly performs the switching to the handover when the reception signal level becomes equal to or less than the threshold level. Accordingly, it is possible to prevent the occurrence of the situation that the handover cannot be performed because the reception signal level from the base station is reduced to a level corresponding to the data communication disabled state.

Also, the communication path currently in connection is held until the reception signal level lowered notice B is notified. Thus, it is possible to perform the base station retrieval of the higher precision by using a time from the notifying of the reception signal level lowered notice A to the notifying of the reception signal level lowered notice B. Therefore, the effect is obtained that the wireless communication terminal can suitably perform the handover on the base station in the better communication state.

[Third Exemplary Embodiment]

Figure 10:
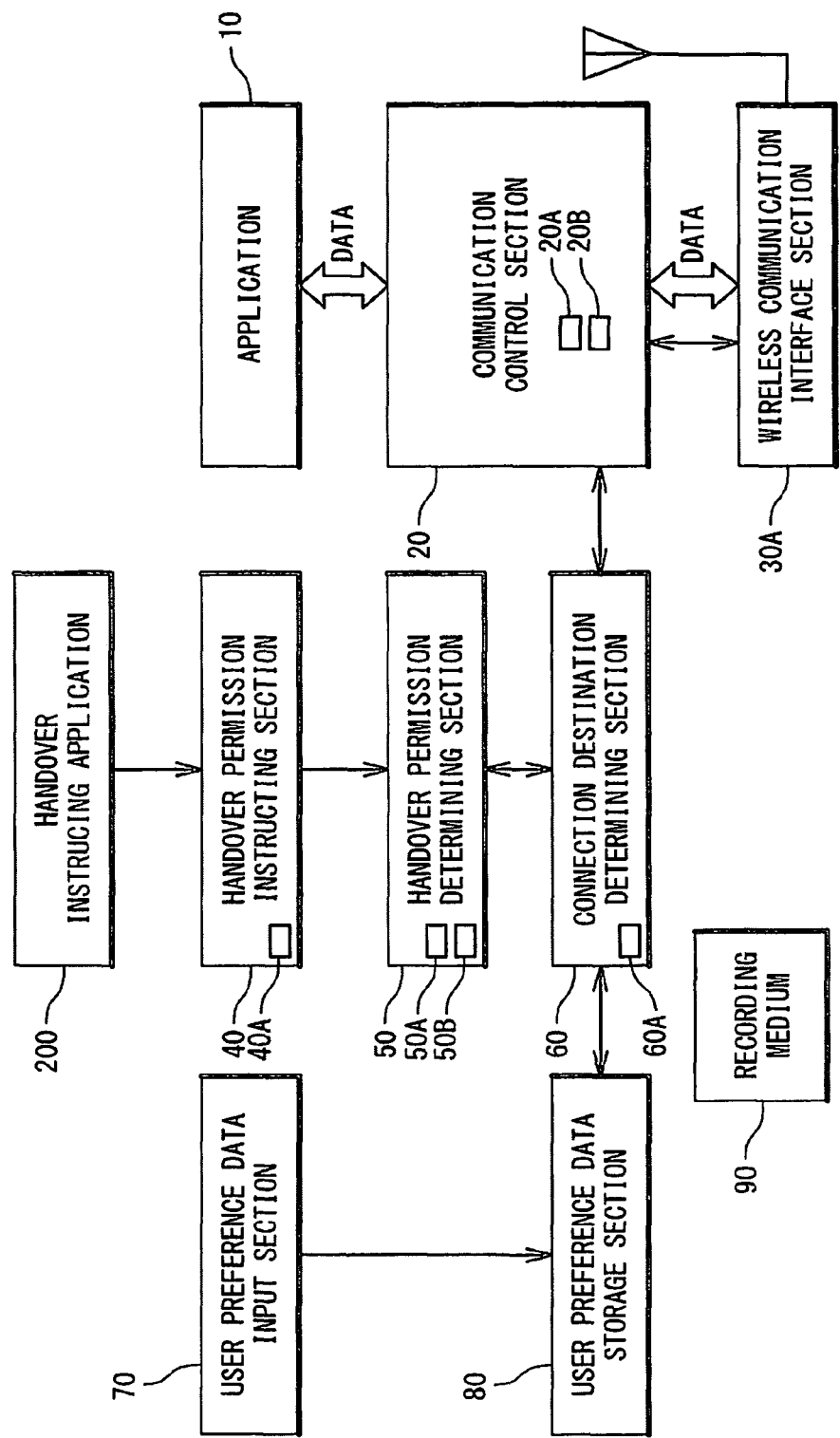
FIG. 10 is a block diagram showing a configuration of a wireless communication terminal according to a third exemplary embodiment of the present invention.

With reference to FIG. 10, the wireless communication system according to the third exemplary embodiment of the present invention differs from the first exemplary embodiment and the second exemplary embodiment in that an application for issuing the handover permission and inhibition instructions to the handover permission determining section 50 through the handover permission instructing section 40 is a handover instructing application 200 differing from the application 10 currently in communication.

The handover instructing application 200 has a function of monitoring and analyzing the application data currently in communication. For this reason, the handover instructing application 200 may be located between the application 10 and the wireless communication interface section 30. The handover instructing application 200 has a data about a timing when the handover permission instruction is issued and the timing when the handover inhibition instruction is issued, on the basis of the monitored data communication content. For example, the handover instructing application 200 may be configured to measure the throughput of the application data currently in communication and issue the handover inhibition instruction when the throughput of the application data is high, and issue the handover permission instruction when the throughput of the application data is low. Also, for example, as mentioned above, the handover instructing application 200 may be configured to determine the speech interval and the silence interval in the speech communication, and issue the handover inhibition instruction at the beginning of the speech interval and issue the handover permission instruction at the ending of the speech interval and the beginning of the silence interval.

Also, the handover instructing application 200 may be configured to have a function of acquiring the application data currently in communication and analyzing the content and then extracting a period during which the influence is little even if it is disconnected, on the basis of the handover permission and inhibition instruction timings in accordance with the communication content for each application 10, and issuing the handover permission and inhibition instructions in accordance with the extracted period. Also, at this time, the handover instructing application 200 may be configured to be able to change the handover permission and inhibition instruction timings that are applied from the application 10 currently in execution.

Since having no necessity of issuing the handover permission and inhibition instructions, the application 10 can obtain the effect of the present invention without any modification of the existing communication application 10. That is, even the existing communication application 10, which cannot issue the handover permission and inhibition instructions, can perform the handover permission and inhibition by employing the configuration in which the handover instructing application 200 is used, and can also obtain the effect of reducing the quality degradation in relation to the handover.

Also, when a plurality of communication applications 10 operate at a same time, there is a fear that the handover permission determining section 50 cannot perform a normal determination because each of the plurality of communication applications 10 requires the handover permission and inhibition instructions. In case of this exemplary embodiment, since the application 200 different from the communication application 10 collectively handles the data communications in the plurality of applications 10, mismatching of the handover permission and inhibition instructions can be prevented. That is, even when the plurality of communication applications operate, the effect of the present invention can be easily obtained.

Also, when the application 200 different from the communication application 10 collectively handles the data communications in the applications 10, the data communication application 10 that is performed with a priority is determined. Then, the handover permission and inhibition instructions can be also issued on this data communication application 10.

Moreover, the handover instructing application 200 may be related to a physical button in the wireless communication terminal 1. Specifically, the handover instructing application 200 is configured to issue the handover inhibition instruction or the handover permission instruction, in accordance with the timing when this button is pushed or released. Thus, the user can control the handover timing through the button. For example, in the period during which the user pushes the button, the handover inhibition state is set, so that the handover is not performed in this period. In the period when the button is released, the handover permission state is set, so that the handover is performed in this period. Also, the configuration opposite thereto is possible. It should be noted that the button may be a button attained by virtual software.

In particular, the handover instructing application 200 may be a PoC (Push to talk over Cellular). In this case, the PoC application requests the user to perform an action of pushing the button, in order to get a right to speak in speech media or other media. That is, by using the already-performed user action, it is possible to determine suitable handover timing without requesting the user to perform the action of pushing the button, for the sake of the present invention. Thus, the effect of improving the quality for the application is obtained.

The wireless communication system according to the third exemplary embodiment of the present invention can be combined with any of the first exemplary embodiment and the second exemplary embodiment.

[Fourth Exemplary Embodiment]

With reference to FIG. 11, the wireless communication system according to the fourth exemplary embodiment of the present invention differs from the first to third exemplary embodiments which contain only the wireless communication interface section 30 of one kind, in that the fourth exemplary embodiment contains the plurality of wireless communication interfaces such as a wireless communication interface section 30A and a wireless communication interface section 30B.

The communication control section 20 contains a control function of the wireless communication interface section 30A and the wireless communication interface section 30B. The user preference data storage section 80 stores desirable connection destination identifiers, priorities and network relation data with regard to the wireless communication interface section 30A and the wireless communication interface section 30B. Also, the user preference data input section 70 has a function of inputting data about the wireless communication interface section 30A and the wireless communication interface section 30B. The configuration other than them is similar to those of the first exemplary embodiment to the third exemplary embodiment.

The operation of the wireless communication system according to the fourth exemplary embodiment of the present invention will be described below in detail. It should be noted that a process indicated in this exemplary embodiment is attained when the CPU in the computer configuring the wireless communication terminal 1 transfers the programs in the recording medium 90 onto the RAM and executes them.

In the above exemplary embodiments, the handover operation is performed by using only one wireless communication interface section. However, this exemplary embodiment greatly differs from the operations in the above exemplary embodiments in that an operation of carrying out the handover to the wireless communication interface section 30B during the connection to the wireless communication interface section 30A or an operation of carrying out the handover to the wireless communication interface section 30A during the connection to the wireless communication interface section 30B can be performed.

It should be noted that the wireless communication interface section 30A and the wireless communication interface section 30B are possible to use various communication methods using radio communications such as WLAN, a mobile telephone network, WiMAX (Worldwide Interoperability for Microwave Access, another name IEEE 802.16e), Bluetooth, PHS (Personal Handyphone System). Both of them are possible to use any combination of the above radio communications. Moreover, the number of wireless communication interface sections is not limited to two, and additional wireless communication interface sections may be contained.

The wireless communication system according to the fourth exemplary embodiment of the present invention can be combined with any of the first to third exemplary embodiments, and any combination is also possible.

The effect of the wireless communication system of the present invention will be described below.

According to the wireless communication terminal of the present invention, it is possible to prevent the switching to the handover at an improper timing in accordance with a communication state of a communication application in the terminal. The handover control is not immediately performed even if a level of the reception signal from the base station currently in connection is reduced to a first threshold level or less, and it is performed after waiting for the situation that the communication state of the communication application currently in communication becomes suitable for the handover.

Also, according to the wireless communication terminal of the present invention, it is possible to prevent the occurrence of the situation that a level of the reception signal from the base station is reduced to a level corresponding to the data communication disabled state so that the handover cannot be performed. A handover forcedly performing condition is defined, and the handover control is forcedly performed when the handover forcedly performing condition is established in a situation that the reception signal level from the base station currently in connection is reduced to the first threshold level or less and in the course of waiting for that the communication state of the communication application becomes suitable for the handover.

Specifically, since the wireless communication terminal of the present invention may include a plurality of wireless communication interface sections, it is possible to prevent the switching to the handover at an improper timing in accordance with the communication state of the communication application 10 even for the handover between the different wireless communication interface sections, and it is possible to prevent the occurrence of the situation that the reception signal level from the base station is reduced to a level corresponding to the data communication disabled state so that the handover cannot be performed. In particular, in the handover between the different wireless communication interface sections, the influence on the communication quality in case of the generation of the handover is considered to be severe for the application data currently in communication since the respective wireless network communication states (such as communication bands and delays) are different, as compared with a case of using the single wireless communication interface section as described in the foregoing exemplary embodiments. Thus, the effect of the present invention can be attained as the quality improvement effect in the application level.

Also, when the handover is performed between the plurality of wireless communication interface sections under the situation that the data communication is performed in the wireless communication interface section previously in connection, the connection of the wireless communication interface previously in connection is continued, until new data communication can be performed after the completion of the connection of the wireless communication interface section for a new connection. Thus, the period during which the data communication is impossible is minimized.

The invention claimed is:

1. A wireless communication terminal comprising:
a communication control section connected with a first base station, and configured to perform a handover control to switch from said first base station to a second base station in response to a connection request;
a first detecting section configured to detect whether or not a reception signal level indicating a level of a received signal from a base station currently in connection as said first base station reduces to be equal to or lower than a first threshold level;
a second detecting section configured to detect whether or not a communication situation of a communication application program currently in communication is a situation suitable for handover;
a third detecting section configured to detect whether or not a predetermined handover forcedly performing condition is established; and
a determining section configured to determine whether or not the handover control is necessary, based on detection results of said first to third detecting sections and outputting a connection request when the handover control is determined to be necessary,
wherein when the communication application program is a software program which receives a content program distributed based on a predetermined broadcast program, said second detecting section detects whether or not the communication situation is suitable for the handover, based on the broadcast program.

2. A wireless communication terminal comprising:
a communication control section connected with a first base station, and configured to perform a handover control to switch from said first base station to a second base station in response to a connection request;
a first detecting section configured to detect whether or not a reception signal level indicating a level of a received signal from a base station currently in connection as said first base station reduces to be equal to or lower than a first threshold level;
a second detecting section configured to detect whether or not a communication situation of a communication application program currently in communication is a situation suitable for handover;
a third detecting section configured to detect whether or not a predetermined handover forcedly performing condition is established; and
a determining section configured to determine whether or not the handover control is necessary, based on detection results of said first to third detecting sections and outputting a connection request when the handover control is determined to be necessary,
wherein said second detecting section determines whether or not the communication situation is suitable for the handover, based on an operation situation of a physical button of said wireless communication terminal or a virtual button.

* * * * *